(12) United States Patent
Gorny et al.

(10) Patent No.: US 6,632,864 B2
(45) Date of Patent: Oct. 14, 2003

(54) COMPOSITION CONTAINING THERMOPLASTIC POLYMERS

(75) Inventors: Rüdiger Gorny, Krefeld (DE); Siegfried Anders, Köln (DE); Wolfgang Nising, Sankt Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/999,861

(22) Filed: Oct. 23, 2001

(65) Prior Publication Data

US 2002/0115758 A1 Aug. 22, 2002

(30) Foreign Application Priority Data

Oct. 26, 2000 (DE) ......................................... 100 53 151

(51) Int. Cl.$^7$ .................... C08K 5/3475; C08K 5/3492; C08K 5/134
(52) U.S. Cl. ........................ 524/91; 524/100; 524/153; 524/154; 524/291; 428/412; 428/480
(58) Field of Search ................................. 428/412, 480; 524/91, 100, 153, 154, 291

(56) References Cited

U.S. PATENT DOCUMENTS

| 5,001,177 A | 3/1991 | Winfried et al. ............... 524/86 |
| 5,108,835 A | 4/1992 | Hähnsen et al. ............. 428/334 |
| 5,288,778 A | * 2/1994 | Schmitter et al. ........... 524/100 |

FOREIGN PATENT DOCUMENTS

| DE | 1670951 | 2/1971 |
| EP | 0 110 221 | 4/1987 |
| EP | 0 786 675 A2 | 7/1997 |
| EP | 0 855 393 A1 | 7/1998 |
| WO | 01/34694 A1 | 5/2001 |

\* cited by examiner

*Primary Examiner*—Kriellion A. Sanders
(74) *Attorney, Agent, or Firm*—Joseph C. Gil; Aron Preis

(57) ABSTRACT

A method of using an extrudable thermoplastic compositions that contains a mixture of benzotriazoles is disclosed. The composition is suitable for producing sheets having improved surface quality.

21 Claims, No Drawings

COMPOSITION CONTAINING THERMOPLASTIC POLYMERS

The present invention relates to compositions containing thermoplastic polymers and benzotriazoles as UV absorbers and products produced therefrom. The products according to the invention are preferably multilayer sheets in which one or both of the outer layers consist of the compositions according to the invention.

Sheets containing thermoplastic polymers are known.

Polycarbonate sheets are known for example from EP-A 0 110 221 and are provided for a plurality of applications. They are produced, for example, by extrusion of polycarbonate-containing compositions and optionally coextrusion with polycarbonate-containing compositions which contain an increased proportion of UV absorbers.

EP-A 0 320 632 and EP-A 0 247 480 describe coextruded sheets made of polycarbonate-containing compositions which contain a low volatile UV absorber based on substituted benzotriazoles.

DE-A 1 670 951 teaches that dimeric benzotriazoles are preferred to the monomeric benzotriazoles due to their considerably lower volatility in the polycarbonate.

A problem which occurs during extrusion of such sheets is the deposition of volatile components from the polycarbonate-containing compositions or, in general thermoplastic polymers on the calibrator (for multi-wall sheets) or on the calender rolls (for solid sheets) which can lead to surface defects. Volatile components are, for example, UV absorbers and other low molecular components of the compositions.

The disadvantage of the sheets according to the prior art is that the surface of the sheets is adversely affected during prolonged extrusion times owing to the above-mentioned evaporations from the melt of the compositions containing polycarbonate or general thermoplastic polymers, particularly during coextrusion.

The increased evaporation of the UV absorber from the melt of the compositions containing polycarbonate or general thermoplastic polymers leads to deposition on the calibrator or the calender rolls and finally to the formation of defects of the sheet surface (for example white spots, undulation, etc.). In addition, the rubbed-off polycarbonate or the rubbed-off thermoplastic polymers on the calibrator generally lead to pulverulent depositions on the coextruded polycarbonate sheets or sheets of thermoplastic polymers.

The object of the present invention is therefore to optimize compositions containing thermoplastic polymers so that the good surface quality of the extruded sheets can be retained with constant protection against UV radiation during extrusion of the compositions to form sheets, even with a prolonged continuous mode of operation.

According to the invention, the object also consists in providing products which can be obtained from the compositions according to the invention.

It has surprisingly been found that compositions which, in addition to thermoplastic polymers, also contain two different UV absorbers in a specific weight ratio to one another achieve the object according to the invention. Products which can be obtained from these compositions also achieve the object according to the invention.

The object according to the invention is achieved by the use of mixtures containing 0.1 to 15 parts by weight of one or more different compounds of Formula (I)

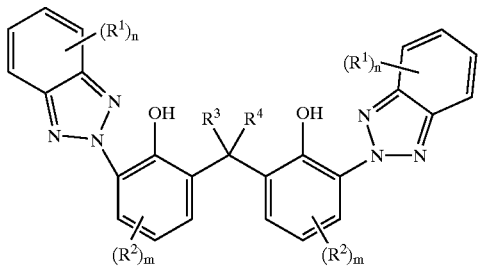

Wherein
R$^1$ and R$^2$ are identical or different and represent H, halogen, C$_1$- to C$_{10}$-alkyl, C$_5$- to C$_{10}$-cycloalkyl, C$_7$- to C$_{13}$-aralkyl, C$_6$- to C$_{14}$-aryl, —OR$^5$ or —(CO)—O—R$^5$, where R$^5$ is H or C$_1$- to C$_4$-alkyl, R$^3$ and R$^4$ are identical or different and represent H, C$_1$- to C$_4$-alkyl, C$_5$- to C$_6$-cycloalkyl, benzyl or C$_6$- to C$_{14}$-aryl, m is 1, 2 or 3 and n is 1, 2, 3 or 4, and 0.0001 to 0,4, preferred 0.001 to 0.4 parts by weight of one or more different compounds of Formula (II):

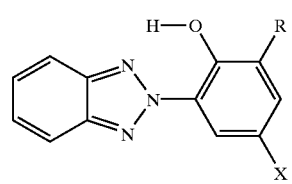

wherein
R and X are identical or different and are H or alkyl or alkylaryl, in compositions containing thermoplastic polymers for improving the extrusion properties to the extent that, when extruding the compositions to form sheets, a good surface quality of the extruded sheets is obtained.

The object according to the invention is also achieved by the use of mixtures containing 0.1 to 15 parts by weight of one or more different compounds of Formula (III):

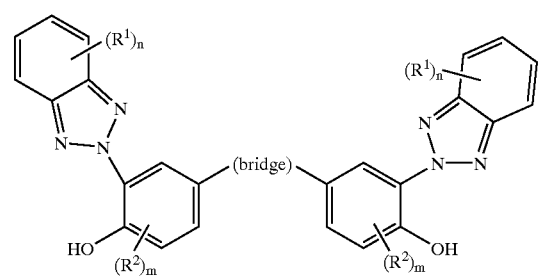

wherein
R$^1$ and R$^2$ are identical or different and represent H, halogen, C$_1$- to C$_{10}$-alkyl, C$_5$- to C$_{10}$-cycloalkyl, C$_7$- to C$_{13}$-aralkyl, C$_6$- to C$_{14}$-aryl, —OR$^5$ or —(CO)—O—R$^5$, where $R^5$ is H or $C_1$- to $C_4$-alkyl,
m is 1, 2 or 3 and
n is 1, 2, 3 or 4,
the bridge represents

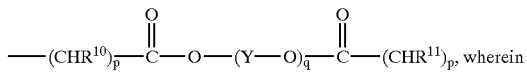 wherein p is equal to 0, 1, 2, or 3,
q is an integer from 1 to 10,
Y is $-CH_2-CH_2-$, $-(CH_2)_3-$, $-(CH_2)_4-$, $-(CH_2)_5-$, $-(CH_2)_6-$, or $CH(CH_3)-CH_2-$ and
$R^{10}$ and $R^{11}$ are identical or different and represent H, $C_1$- to $C_4$-alkyl, $C_5$- to $C_6$-cycloalkyl, benzyl or $C_6$- to $C_{14}$-aryl and 0.0001 to 0,4 preferred to 0,4 0.001 to 0.4 parts by weight of one or more compounds of above-mentioned Formula (II),
in compositions containing thermoplastic polymers for improving the extrusion properties to the extent that, when extruding the compositions to form sheets, a good surface quality of the extruded sheets is obtained.

The use of mixtures of compounds of Formula (I) and (II) or (III) and (II) in the sense of the above paragraphs does not inevitably mean that the compounds of Formula (I) and (II) or (III) and (II) must initially be mixed with one another before they are used to stabilize thermoplastic polymers against UV radiation. Any use which leads to compounds of Formula (I) and compounds of Formula (II) or compounds of Formula (III) and compounds of Formula (II) being simultaneously effective in thermoplastic polymers for UV protection is possible according to the invention. For example, the thermoplastic polymers can initially be supplied with compounds of Formula (II) and then compounds of Formula (I).

The object according to the invention is also achieved by a composition containing thermoplastic polymers and 0.1 to 15 wt. %, preferably 0.11 to 10 wt. %, particularly preferably 0.13 to 8 wt. %,
one or more different compounds of Formula (I),
and 0.0001 to 0,4 wt. %, preferred 0.001 to 0.4 wt. %, preferably 0.0015 to 0.35 wt. %, particularly preferably 0.002 to 0.3 wt. %,
one or more different compounds of Formula (II).

The object according to the invention is also achieved by a composition containing
thermoplastic polymers and 0.1 to 15 wt. %, preferably 0.11 to 10 wt. %, particularly preferably 0.13 to 8 wt. %,
one or more different compounds of general Formula (III)
and 0.0001 to 0,4 wt. %, preferred 0.001 to 0.4 wt. %, preferably 0.0015 to 0.35 wt. %, particularly preferably 0.002 to 0.3 wt. %
one or more different compounds of Formula (II).
Of the compounds of Formulae (I), (II) and (III) those where
$R^1$=H, $R^2$=$C_1$- to $C_8$-alkyl, particularly $R^2$=isooctyl, $R^3$=H, $R^4$=H, m=1, n=4, R=H or 2-butyl or tert.butyl or $-C(CH_3)_2$-phenyl, X=$C_1$- to $C_8$-alkyl or $-C(CH_3)_2$-phenyl or isooctyl, p=0, 1, 2 or 3, q=1 to 8, Y=$-(CH_2)_6$ or $-(CH_2)_2$, $R^{10}$=H and $R^{11}$=H.
A composition in which the sum of thermoplastic polymers and compounds according to Formula (I) and compounds according to Formula (II) and compounds according to Formula (III) is 50 to 100 wt. % is preferred.

According to the invention, any thermoplastic polymers can be used. Thermoplastic polymers selected from the group consisting of polycarbonate, polyester, polymethylmethacrylate, transparent polyvinyl chloride, transparent polystyrene, SAN and high impact polystyrene are preferred.

Polyester, in particular polyethylene terephthalate (PET) and copolyester made of terephthalic acid, isophthalic acid, glycol and cyclohexane-1,4-dimethanol (for example PETG) are particularly preferred.

Also particularly preferred is polycarbonate, which is selected from the group consisting of bisphenol A homopolycarbonate and copolycarbonates based on the two monomers bisphenol A and 1,1-bis-(4-hydroxyphenyl)-3,3,5-trimethylcyclohexane.

A composition according to the invention which additionally contains 0.01 to 0.6 wt. % of esters or partial esters of monohydric to hexahydric alcohols is also preferred.

A composition according to the invention which additionally contains 10 to 6,000 ppm of heat stabilizers is also preferred.

In this case, the heat stabilizers are preferably selected from the group consisting of tris-(2,4-di-tert.butylphenyl) phosphite and triphenylphosphine.

The object according to the invention is also achieved by a product containing a composition according to the invention.

The product according to the invention is preferably selected from the group consisting of single-layer sheet, multilayer sheet, multilayer multi-wall sheet, corrugated solid sheet, multi-wall profiled part, multi-wall profiled part with tongue and groove, connecting system, glazing for greenhouses, glazing for conservatories, glazing for bus stops, advertising hoardings, sign, safety screen, motor car glazing, window and roofing.

A multilayer sheet is preferred, wherein at least one layer contains a composition according to the invention.

A multilayer sheet is also preferred, wherein one of the outermost layers of the sheet or both outermost layers of the sheet contain a composition according to the invention.

In this case it is particularly preferred that the sheet has at least two layers and that at least one of the inner layers contains a composition according to the invention, the content of compounds according to Formula (I) and compounds according to Formula (II) or compounds according to Formula (III) and compounds according to Formula (II) of which is preferably 0.02 to 1 wt. % in total.

The preferred process for producing the sheets according to the invention is coextrusion.

The compositions according to the invention can additionally contain conventional additives, in particular conventional processing acids, in particular mould release agents and eluents and stabilisers, in particular heat stabilisers.

For the sake of clarity, the compounds according to Formula (I), (II) and (III) are designated as UV absorbers in the context of the present invention.

The compositions according to the invention and the products produced therefrom, in particular sheets, have numerous advantages. The problems known from the prior art, such as deposition of volatile components from the compositions on calibrators or calender rolls during extrusion, do not occur. This advantage of the compositions according to the invention occurs particularly when the compositions according to the invention are used to produce multilayer sheets, wherein one or both of the outer layers of the sheets consist of the compositions according to the invention or contain them. In this case, the UV absorber content in the compositions according to the invention is preferably 3 to 8 wt. % in the one or both outer layers. The compositions according to the invention are well protected against UV radiation.

The compositions according to the invention and the products produced therefrom also have numerous additional advantages. For example, the products according to the invention have good mechanical properties which substantially correspond to those of the thermoplastic polymer used. Furthermore, the products according to the invention have good optical properties, for example high transparency, when transparent thermoplastic polymers are used.

The compositions according to the invention containing thermoplastic polymers have proved to be particularly advantageous industrially. They may be processed without difficulty and do not exhibit any impairments in the final product.

The weathering resistance corresponds at least to that of sheets which have been produced according to the state of the art.

The compounds to be used according to the invention according to Formula (I), (II) and (III) are commercially available. They may be produced by known processes.

The total percentage by weight of thermoplastic polymers and UV absorber in the compositions according to the invention is preferably 60 to 100 wt. %, particularly preferably 80 to 100 wt. %, most particularly preferably 90 to 100 wt. %.

The compositions according to the invention can also contain additional conventional additives in the conventional quantities in addition to the explicitly mentioned components. A particularly preferred embodiment of the invention is obtained if, in addition to the explicitly mentioned components, the compositions according to the invention do not contain any additional components, i.e. if the compositions according to the invention consist of the explicitly mentioned components.

Compounds of Formula (I) such as 2,2-methylenebis-(4-(1,1,3,3-tetramethylbutyl)-6-(2H-benzotriazol-2-yl)phenol) are sold commercially under the name Tinuvin® 360 or Adeka Stab® LA 31. Compounds of Formula (II) are 2-(2-hydroxy-5-tert-octyl-phenyl)-2H-benzotriazole (Tinuvin® 329), 2-(2H-benzotriazol-2-yl)-4-(1,1-dimethylethyl)-6-(2-methylpropyl)-phenol (Tinuvin® 350) or 2-[2'-hydroxy-3,5-di(1,1-dimethylbenzyl)phenyl]-2H-benzotriazole (Tinuvin® 234).

Tinuvins are available from Ciba Spezialitätenchemie, Lampertheim, Germany.

Polycarbonates for the compositions according to the invention or the products obtained therefrom are homopolycarbonates, copolycarbonates and thermoplastic polyester carbonates. They preferably have mean molecular weights $\overline{M}_w$ of 18,000 to 40,000, preferably of 26,000 to 36,000 and in particular of 28,000 to 35,000 g/mol, determined by measuring the relative solution viscosity in dichloromethane or in mixtures of identical quantities by weight of phenol/o-dichlorobenzene calibrated by light scattering. In the event of coextrusion, the melt viscosity of the coextrusion compositions should preferably be smaller than that of the substrates to which they are applied.

For production of polycarbonates reference is made by way of example to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), to D. Freitag, U. Grigo, P. R. Müller, N. Nouvertne, BAYER A G, "Polycarbonates" in Encyclopedia of Polymer Science and Engineering, Vol. 11, Second Edition, 1988, pages 648 to 718 and to U. Grigo, K. Kircher and P. R. Müller, "Polycarbonate" in Becker/Braun, Kunststoff-Handbuch, Vol. 3/1, Polycarbonate, Polyacetale, Polyester, Cellulosester, Carl Hanser Verlag Munich, Vienna 1992, pages 117 to 299. Production is preferably by means of the interfacial polycondenzation process or the melt transesterification process and is described, by way of example, by the interfacial polycondenzation process.

Bisphenols of general Formula HO—Z—OH, wherein Z is a difunctional organic radical with 6 to 30 carbon atoms which contains one or more aromatic groups, are compounds which are preferably used as starting compounds. Examples of such compounds are bisphenols which belong to the group of dihydroxydiphenyls, bis(hydroxyphenyl) alkanes, indanebisphenols, bis(hydroxyphenyl)ethers, bis(hydroxyphenyl)sulphones, bis(hydroxyphenyl)ketones and α,α'-bis(hydroxyphenyl)-diisopropylbenzenes.

Particularly preferred bisphenols which belong to the above-mentioned compound groups are bisphenol A, tetraalkylbisphenol A, 4,4-(meta-phenylenediisopropyl)-diphenol (bisphenol M), 4,4-(para-phenylenediisopropyl) diphenol, 1,1-bis-(4-hydroxyphenyl)-3,3,5-trimethylcyclohexane (BP-TMC) and optionally mixtures thereof. Particularly preferred are homopolycarbonates based on bisphenol A and copolycarbonates based on the monomers bisphenol A and 1,1-bis-(4-hydroxyphenyl)-3,3,5-trimethylcyclohexane. The bisphenol compounds to be used according to the invention are reacted with carboxylic acid compounds, in particular phosgene or, in the melt transesterification process, diphenylcarbonate or dimethylcarbonate.

Polyester carbonates are obtained by reacting the aforementioned bisphenols with at least one aromatic dicarboxylic acid and optionally carboxylic acid equivalents. Suitable aromatic dicarboxylic acids are, for example, phthalic acid, terephthalic acid, isophthalic acid, 3,3'- or 4,4'-diphenyldicarboxylic acid and benzophenone-dicarboxylic acids. A portion, up to 80 mol %, preferably 20 to 50 mol %, of the carbonate groups in the polycarbonates can be replaced by aromatic dicarboxylic acid ester groups.

Inert organic solvents used in the interfacial polycondenzation process are, for example, dichloromethane, the various dichloroethanes and chloropropane compounds, tetrachloromethane, trichloromethane, chlorobenzene and chlorotoluene.

Chlorobenzene or dichloromethane and mixtures of dichloromethane and chlorobenzene are preferably used.

The interfacial polycondenzation reaction can be accelerated by catalysts such as tertiary amines, in particular N-alkylpiperidines or onium salts. Tributylamine, triethylamine and N-ethylpiperidine are preferably used. The catalysts mentioned in DE-A 42 38 123 are preferably used in the case of the melt transesterification process.

The polycarbonates can be branched in a deliberate and controlled manner by using small quantities of branching agent. Some suitable branching agents are: phloroglucinol, 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl) ethane; tri-(4-hydroxyphenyl)-phenylmethane; 2,2-bis-[4,4- bis(4-hydroxyphenyl)-cyclohexyl]-propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2, 4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxyphenyl-isopropyl)-phenoxy)-methane; α,α',α"-tris-(4-hydroxyphenyl)-1,3,5-triisopropyl-benzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxy-triphenyl-methyl)-benzene and in particular 1,1,1-tri-(4-hydroxyphenyl)-ethane and bis-(3-methyl-4-hydroxyphenyl)-2-oxo-2,3-dihydroindole.

The 0.05 to 2 mol % optionally also to be used, based on the diphenols used, of branching agents or mixtures of branching agents, can be used together with the diphenols, but can also be added in a subsequent stage of the synthesis.

Phenols such as phenol, alkylphenols such as cresol and 4-tert.-butylphenol, chlorophenol, bromophenol, cumylphenol or mixtures thereof are preferably used in quantities of 1 to 20 mol %, preferably 2 to 10 mol %, per mol of bisphenol as chain terminators which can also be used. Phenol, 4-tert.-butylphenol and cumylphenol are preferred.

Chain terminators and branching agents can be added separately or also together with the bisphenol to the syntheses.

Production of the polycarbonates by the melt transesterification process is described by way of example in DE-A 42 38 123.

The compositions according to the invention can also contain stabilizers.

Suitable stabilizers for the compositions according to the invention are, for example, phosphines, phosphates or Si-containing stabilizers and further compounds described in EP-A 0 500 496. Examples include triphenylphosphites, diphenylalkylphosphites, phenyldialkylphosphites, tris-(nonylphenyl)phosphite, tetrakis-(2,4-di-tert.-butyl-phenyl)-4,4'-biphenylene-diphosponite and triarylphosphite. Triphenylphosphine and tris-(2,4-di-tert.-butylphenyl)phosphite are particularly preferred.

The polycarbonate-containing compositions according to the invention can also contain 0.01 to 0.6 wt. % of the esters or partial esters of monohydric to hexahydric alcohols, in particular of glycerol, of pentaerythritol or of guerbeta alcohols.

Monohydric alcohols are, for example, stearyl alcohol, palmityl alcohol and guerbeta alcohols.

A dihydric alcohol is, for example, glycol.

A trihydric alcohol is, for example, glycerol.

Tetrahydric alcohols are, for example, pentaerythritol and mesoerythritol.

Pentahydric alcohols are, for example, arabitol, ribitol and xylitol.

Hexahydric alcohols are, for example, mannitol, glucitol (sorbitol) and dulcitol.

The esters are preferably the monoesters, diesters, triesters, tetraesters, optionally pentaesters and hexaesters or mixtures thereof, in particular statistical mixtures of saturated, aliphatic $C_{10}$- to $C_{36}$-monocarboxylic acids and optionally hydroxy monocarboxylic acids, preferably with saturated, aliphatic $C_{14}$- to $C_{32}$-mono-carboxylic acids and optionally hydroxy monocarboxylic acids.

The commercially available fatty acid esters, in particular of pentaerythritol and glycerol, can contain up to 60% of different partial esters, depending on production.

Saturated, aliphatic monocarboxylic acids with 10 to 36 carbon atoms are, for example, capric acid, lauric acid, myristic acid, palmitic acid, stearic acid, hydroxystearic acid, arachidic acid, behenic acid, lignoceric acid, cerotic acid and montanic acids.

Preferred saturated, aliphatic monocarboxylic acids with 14 to 22 carbon atoms are, for example, myristic acid, palmitic acid, stearic acid, hydroxystearic acid, arachidic acid and behenic acid.

Saturated, aliphatic monocarboxylic acids such as palmitic acid, stearic acid and hydroxystearic acid are particularly preferred.

The saturated, aliphatic $C_{10}$- to $C_{36}$-carboxylic acids and the fatty acid esters to be used according to the invention are either known as such from the literature or can be produced by processes known from the literature. Examples of pentaerythritol fatty acid esters are those of the above-mentioned monocarboxylic acids which are particularly preferred.

Esters of pentaerythritol and glycerol with stearic acid and palmitic acid are particularly preferred.

Esters of guerbeta alcohols and of glycerol with stearic acid and palmitic acid and optionally hydroxystearic acid are also particularly preferred.

Examples of antistatics which can be contained in the compositions according to the invention are cation-active compounds, for example quaternary ammonium, phosphonium or sulphonium salts, anion-active compounds, for example alkyl sulphonates, alkyl sulphates, alkyl phosphates, carboxylates in the form of alkali or alkaline earth metal salts, non-ionogenic compounds, for example polyethylene glycol esters, polyethylene glycol ethers, fatty acid esters, ethoxylated fatty amines. Preferred antistatics are non-ionogenic compounds.

The compositions according to the invention can also contain organic dyes, inorganic coloured pigments, fluorescent dyes and optical brighteners.

Any feedstock and solvents used for the synthesis of the coextrusion compounds according to the invention may be contaminated with corresponding impurities during production and storage, wherein the aim is to work with starting materials which are as pure as possible.

The individual components can be mixed in a known manner both in succession and simultaneously and, more precisely, both at ambient temperature and at elevated temperature.

The additives, in particular the UV absorbers and additional above-mentioned additives, are preferably incorporated into the polycarbonate-containing com-positions according to the invention in a known manner by mixing polymer granules with the additives at temperatures of preferably approximately 200 to 360° C. in conventional units such as internal kneaders, single screw extruders and double shaft extruders, for example by melt compounding or melt extrusion or by mixing the solutions of the polymer with solutions of the additives and subsequent evaporation of the solvents in a known manner. The proportion of additive in the moulding compositions can be varied within wide limits and depends on the desired properties of the compositions. The total proportion of additive in the compositions is preferably approximately up to 20 wt. %, preferably 0.1 to 12 wt. % based on the weight of the composition.

The UV absorbers can also be incorporated into the compositions according to the invention for example by mixing solutions of the UV absorbers and optionally additional above-mentioned additives with solutions of the plastics materials in suitable organic solvents such as $CH_2Cl_2$, halogen alkanes, aromatic halogen compounds, chlorobenzene and xylenes. The substance mixtures are then preferably homogenised in a known manner by extrusion. The solvent mixtures are preferably removed in a known manner, for example compounded, by evaporation of the solvent and subsequent extrusion.

The invention also relates to products which have been produced using the compositions according to the invention containing thermoplastic polymers. The compositions containing thermoplastic polymers can be used to produce solid polymer sheets and so-called multi-wall sheets (for example twin-wall sheets or triple-wall sheets). The sheets therefore also include those which have an additional outer layer, on one side or on both sides, with the compositions according to the invention containing thermoplastic polymers with an increased UV absorber proportion.

The compositions according to the invention containing thermoplastic polymers allow easier production of products, in particular of sheets and products produced therefrom such as glazings for greenhouses, conservatories, bus stops, advertising boards, signs, safety screens, motor car glazings, windows and roofings.

Subsequent processing of the products coated with the compositions according to the invention containing thermoplastic polymers, such as thermoforming or surface processing, such as finishing with scratch-resistant lacquers, water-spreading layers and the like are possible and the products produced by these processes are also the subject of the present invention.

Coextrusion is known as such from the literature (see for example EP-A 110 221 and EP-A 110 238). In the present case, the procedure is preferably as follows:

Extruders for producing the core layer and the outer layer(s) are connected to a coextrusion adapter. The adapter is designed in such a way that the melts forming the outer layer(s) are applied in an adhesive manner as a thin layer to the melt of the core layer.

The multilayer melt strand produced in this way is then preferably brought into the desired shape (multi-wall sheet or solid sheet) in the subsequently connected die. The melt is then cooled under controlled conditions, preferably in a known manner by calendering (solid sheet) or vacuum calibration (multi-wall sheet) and subsequently cut to size. A conditioning oven can optionally be arranged after calibration to eliminate stresses. Instead of the adapter arranged upstream of the die, the die itself can also be designed in such a way that the melts merge there.

The invention will be described further by the following example.

EXAMPLE 10 mm twin-wall sheets A to G, as they are described for example in EP-A 0 110 238, were obtained from the following polycarbonate-containing compositions: Makrolon® 1143 (branched bisphenol A polycarbonate produced by Bayer A G, Leverkusen, Germany with a melt fusion rate (MFR) of 3.0 g/10 min at 300° C. and 1.2 kg load) was used as base material. This was coextruded with the compounds specified in the Table based on Makrolong 3208 (linear bisphenol A polycarbonate produced by Bayer A G, Leverkusen, Germany with a melt fusion rate (MFR) of 4.5 g/10 min at 300° C. and 1.2 kg load).

The thickness of the coextruded layer was approximately 50 μm in each case.

| Sheet | Tinuvin® 360*) | Additional UV absorber | Mould release agent |
|-------|----------------|------------------------|---------------------|
| A | 10% | 0.25% Tinuvin 350***) | 0.25% PETS**) |
| B | 10% | 0.10% Tinuvin 329****) | 0.25% PETS**) |
| C | 10% | 0.25% Tinuvin 329****) | 0.25% PETS**) |
| D | 10% | 0.25% Tinuvin 234*****) | 0.25% PETS**) |
| E | 10% | — | 0.25% PETS**) |
| F | 5% | — | 0.25% PETS**) |
| G | 5% | 0.23 T Tin 350***) | 0.25% PETS**) |

*)2,2-methylenebis-(4-(1,1,3,3-tetramethylbutyl)-6-(2H-benzotriazol-2-yl)-phenol, commercially available from Ciba Spezialitätenchemie, Lampertheim, Germany; comes under Formula (I)
**)Pentaerythritol tetrastearate, commercially available as Loxiol® VPG 861 produced by Cognis, Düsseldorf, Germany
***)2-(2H-benzotriazol-2-yl)-4-(1,1-dimethylethyl)-6-(2-methylpropyl)-phenol; commercially available from Ciba Spezialitätenchemie, Lampertheim, Germany; comes under Formula (II)
****)2-(2-hydroxy-5-tert-octylphenyl)-2H-benzotriazole; commercially available from Ciba Spezialitätenchemie, Lampertheim, Germany; comes under Formula (II)
*****)2-[2'-hydroxy-3,5-di(1,1-dimethylbenzyl)phenyl]-2H-benzotriazole; commercially available from Ciba Spezialitätenchemie, Lampertheim, Germany; comes under Formula (II)

The machines and apparatus used to produce the compounds and for the subsequent production of multilayer multi-wall sheets are described below:
The device for compounding consisted of
  metering devices for the components
  a synchronous twin-shaft kneader (ZSK 53 produced by Werner & Pfleiderer) with a screw diameter of 53 mm
  a perforated nozzle for shaping melt strands
  a water bath for cooling and solidifying the strands
  a granulator
The machines and apparatus used to produce multilayer multi-wall sheets are described below:
The device consisted of
  the main extruder with a screw of length 33 D and a diameter of 70 mm with degasification
  the coextruding adapter (feed block system)
  a coextruder for applying the outer layer with a screw of length 25 D and a diameter of 30 mm
  the special slot die with a width of 350 mm
  the calibrator
  the gravity roller conveyor
  the take-up device
  the cutting device (saw)
  the stacking table.

The polycarbonate granules of the base material were supplied to the feed hopper of the main extruder, the UV coextrusion material to that of the coextruder. Melting and conveying of the respective material took place in the respective cylinder/screw plasticising system. The two material melts were merged in the coextrusion adapter and formed a composite after leaving the nozzle and being cooled in the calibrator. The other devices were used for transport, cutting to size and depositing the extruded sheets.
Coextrusion with E (Reference):
  large area surface defects which adversely affect the sheet quality after 75 min
  Score: poor Coextrusion with A:
large area surface defects which adversely affect the sheet quality after 230 min
Score: good Coextrusion with B:
large area surface defects which adversely affect the sheet quality after 190 min
Score: good to satisfactory Coextrusion with C:
large area surface defects which adversely affect the sheet quality after 220 min
Score: good Coextrusion with D:
large area surface defects which adversely affect the sheet quality after 120 min
Score: satisfactory Coextrusion with F (Reference):
large area surface defects which adversely affect the sheet quality after 260 min
Score: satisfactory Coextrusion with G:
large area surface defects which adversely affect the sheet quality did not occur during the test duration of 5 h
Score: very good

What is claimed is:

1. A molding composition containing a thermoplastic polymer and 0.1 to 15 wt. % of one or more compounds of Formula (I):

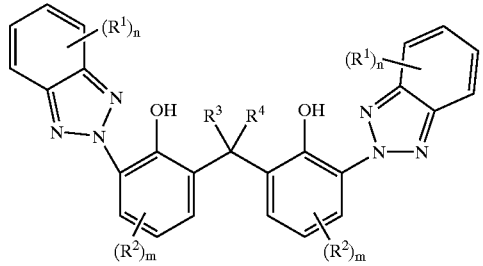

(I)

wherein
$R^1$ and $R^2$ independently denote H, halogen, $C_1$- to $C_{10}$-alkyl, $C_5$- to $C_{10}$-cycloalkyl, $C_7$- to $C_{13}$-aralkyl, $C_6$- to $C_{14}$-aryl, —$OR^5$ or —(CO)—O—$R^5$, where $R^5$ is H or $C_1$- to $C_4$-alkyl,
$R^3$ and $R^4$ independently denote H, $C_1$- to $C_4$-alkyl, $C_5$- to $C_6$-cycloalkyl, benzyl or $C_6$- to $C_{14}$-aryl,
m is 1, 2 or 3 and n is 1, 2, 3 or 4,
and 0.0001 to 0.4 wt. % of one or more compounds of Formula (II):

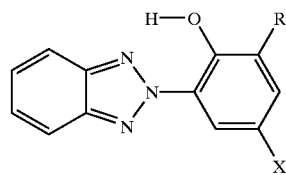

(II)

wherein
R and X independently denote H, alkyl or alkylaryl, the percent, both occurrences being relative to the weight of the composition.

2. Process for producing single layer or multilayer sheets, wherein at least one layer contains a composition according to claim 1, by extrusion or coextrusion.

3. Product containing a composition according to claim 1.

4. Product according to claim 3, selected from the group consisting of single-layer sheet, multilayer sheet, multilayer multi-wall sheet, corrugated solid sheet, multi-wall profiled part, multi-wall profiled part with tongue and groove, connecting system, glazing for greenhouses, glazing for conservatories, glazing for bus stops, advertising hoardings, sign, safety screen, motor car glazing, window and roofing.

5. Multilayer sheet, wherein at least one layer contains a composition according to claim 1.

6. Multilayer sheet, wherein one of the outermost layers of the sheet or both outermost layers of the sheet contain a composition according to claim 1.

7. A process of using a mixture containing 0.1 to 15 parts by weight,
one or more compounds of Formula (I):

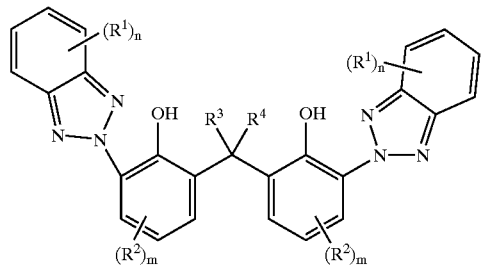

wherein
$R^1$ and $R^2$ independently denote H, halogen, $C_1$- to $C_{10}$-alkyl, $C_5$- to $C_{10}$-cycloalkyl, $C_7$- to $C_{13}$-aralkyl, $C_6$- to $C_{14}$-aryl, —$OR^5$ or —(CO)—O—$R^5$, where $R^5$ is H or $C_1$- to $C_4$-alkyl,
$R^3$ and $R^4$ independently denote H, $C_1$- to $C_4$-alkyl, $C_5$- to $C_6$-cycloalkyl, benzyl or $C_6$- to $C_{14}$-aryl,
m is 1, 2 or 3 and n is 1, 2, 3 or 4,
and 0.0001 to 0.4 parts by weight of one or more compounds of Formula (II)

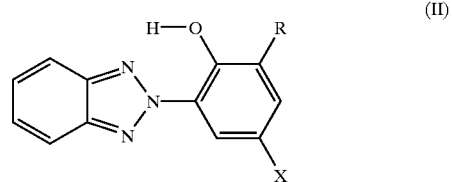

(II)

wherein
R and X independently denote H, alkyl or alkylaryl,
comprising obtaining a thermoplastic resin, mixing said resin with said mixture to obtain a composition and extruding said composition to obtain a sheet having good surface quality.

8. A process of using a mixture containing 0.1 to 15 parts by weight of one or more compounds of general Formula (III):

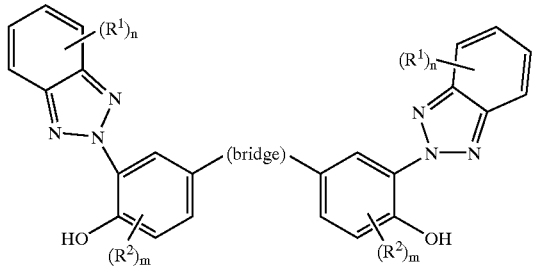

wherein
R$^1$ and R$^2$ independently denote H, halogen, C$_1$- to C$_{10}$-alkyl, C$_5$- to C$_{10}$-cycloalkyl, C$_7$- to C$_{13}$-aralkyl, C$_6$- to C$_{14}$-aryl, —OR$^5$ or —(CO)—O—R$^5$, where R$^2$ is H or C$_1$- to C$_4$-alkyl,
m is 1, 2 or 3 and
n is 1, 2, 3 or 4,
the bridge represents

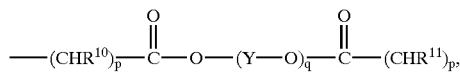

wherein
p is equal to 0,1, 2 or 3,
q is an integer from 1 to 10,
Y is —CH$_2$—CH$_2$—, —(CH$_2$)$_3$—, —(CH$_2$)$_4$—, —(CH$_2$)$_5$—, —(CH$_2$)$_6$—, or CH(CH$_3$)—CH$_2$— and R$^{10}$ and R$^{11}$ independently denote H, C$_1$- to C$_4$-alkyl, C$_5$- to C$_6$-cycloalkyl, benzyl or C$_6$- to C$_{14}$-aryl,
and 0.0001 to 0.4 parts by weight of one or more compounds of formula (II) of according to claim 7 comprising obtaining a thermoplastic resin, mixing said resin with said mixture to obtain a composition and extruding said composition to obtain a sheet having good surface quality.

9. A molding composition containing a thermoplastic polymer and 0.1 to 15 wt. % of one or more compounds of Formula (III):

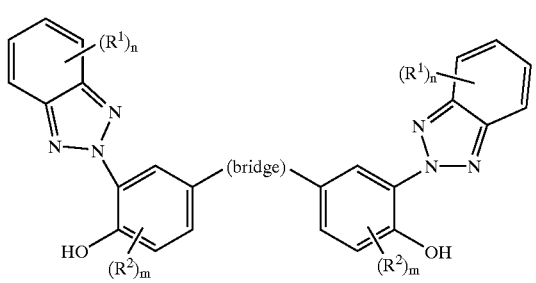

wherein
R$^1$ and R$^2$ independently denote H, halogen, C$_1$- to C$_{10}$-alkyl, C$_5$- to C$_{10}$-cycloalkyl, C$_7$- to C$_{13}$-aralkyl, C$_6$- to C$_{14}$-aryl, —OR$^5$ or —(CO)—O—R$^5$, where R$^5$ is H or C$_1$- to C$_4$-alkyl,
m is 1, 2 or 3 and
n is 1, 2, 3 or 4,
the bridge represents

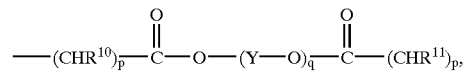

wherein
p is equal to 0, 1, 2 or 3,
q is an integer from 1 to 10,
Y is —CH$_2$—CH$_2$—, —(OH$_2$)$_3$—, —(CH$_2$)$_4$—, —(OH$_2$)$_5$—, —(CH$_2$)$_6$—, or CH(CH$_3$)—CH$_2$— and R$^{10}$ and R$^{11}$ independently denote H, C$_1$- to C$_4$-alkyl, C$_5$- to C$_6$-cycloalkyl, benzyl or C$_6$- to C$_{14}$-aryl,
and 0.0001 to 0.4 wt. % of one or more compounds of Formula (II):

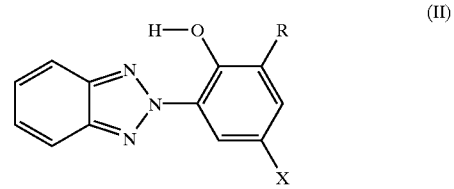

wherein
R and X independently denote H, alkyl or alkylaryl, the percent, both occurrences being relative to the weight of the composition.

10. The composition of claim 1 wherein the compound of formula (I) is present in an amount of 0.11 to 10 wt. % and the compound of formula (II) is present in an amount of 0.015 to 0.35 wt. %.

11. The composition of claim 9 wherein the compound of formula (III) is present in an amount of 0.11 to 10 wt. % and the compound of formula (II) is present in an amount of 0.015 to 0.35 wt. %.

12. The composition of claim 1 wherein the thermoplastic polymer is at least one member selected from the group consisting of bisphenol A-based homopolycarbonate and a copolycarbonate based on bisphenol A and 1,1-bis-(4-hydroxyphenyl)-3,3,5-trimethylcyclohexane.

13. The composition of claim 9 wherein the thermoplastic polymer is at least one member selected from the group consisting of bisphenol A-based homopolycarbonate and a copolycarbonate based on bisphenol A and 1,1-bis-(4-hydroxyphenyl)-3,3,5-trimethylcyclohexane.

14. The composition of claim 1 wherein the thermoplastic polymer is PETG.

15. The composition of claim 9 wherein the thermoplastic polymer is PETG.

16. The composition of claim 1 further containing 0.01 to 0.6 wt % of an ester or partial ester of at least one monohydric to hexahydric alcohol.

17. The composition of claim 9 further containing 0.01 to 0.6 wt. % of an ester or partial ester of at least one monohydric to hexahydric alcohol.

18. The composition of claim 1 further containing 10 to 6000 ppm of a heat stabilizer.

19. The composition of claim 9 further containing 10 to 6000 ppm of a heat stabilizer.

20. The composition of claim 18 wherein the stabilizer is a member selected from the group consisting of tris-(2,4-di-tert.butylphenyl)phosphite and triphenylphosphine.

21. The composition of claim 19 wherein the stabilizer is a member selected from the group consisting of tris-(2,4-di-tert.butylphenyl)phosphite and triphenylphosphine.

* * * * *